May 16, 1950 R. M. JOLLY 2,508,166
REGULATING SYSTEM
Filed Jan. 30, 1948
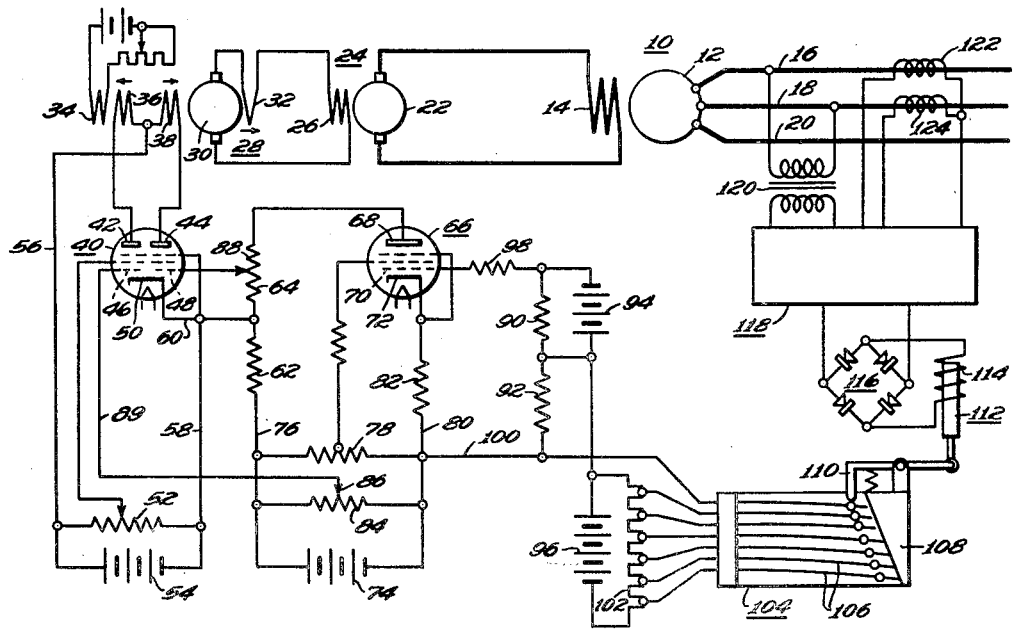
WITNESSES:
Robert C. Baird
Nw. C. Groome
INVENTOR
Robert M. Jolly.
BY
James N. Ely
ATTORNEY Patented May 16, 1950

2,508,166

UNITED STATES PATENT OFFICE 2,508,166

REGULATING SYSTEM

Robert M. Jolly, Pittsburgh, Pa., assignor to Westinghouse Electric Corporation, East Pittsburgh, Pa., a corporation of Pennsylvania Application January 30, 1948, Serial No. 5,391

3 Claims. (Cl. 322—17)

This invention relates to regulating systems.

An object of this invention is the provision of a sensitive, quick responsive regulating system for maintaining an electrical quantity substantially constant.

Another object of this invention is to provide a regulating system having an electronic component for controlling the polarity of a control voltage applied to a regulating generator.

Other objects of this invention will become apparent from the following description when taken in conjunction with the accompanying drawing, the single figure of which is a diagrammatic view of apparatus and circuits embodying the teachings of this invention.

Referring to the drawing, this invention is illustrated in connection with regulating the operation of a dynamo-electric machine 10 having an armature winding 12 and a field winding 14, the dynamo-electric machine being connected to supply a load circuit represented by the conductors 16, 18 and 20. The field winding 14 is connected across the armature winding 22 of a suitable exciter 24 which is also provided with a field winding 26.

In order to control the excitation of the exciter 24, a self-excited regulating generator or exciter 28 is disposed with its armature winding 30 connected across the field winding 26 of the exciter 24. The regulating generator 28 is provided with a plurality of field windings such as the series field winding 32, a separately excited field winding 34 and a pair of opposed control field windings 36 and 38. In practice, the regulating generator or exciter 28 may be of any of the self-excited types or may be of the design disclosed in copending application Serial No. 607,440, filed July 27, 1945, now Patent No. 2,484,835, issued October 18, 1949, in the name of E. L. Harder, and assigned to the assignee of this application.

In order to selectively supply energy to the opposed field windings 36 and 38, a vacuum valve 40 having twin anodes 42 and 44 and control grids 46 and 48 and a cathode 50 is disposed to connect the field windings to a source of energy which in this case is represented by resistor 52 connected across the battery 54. Thus the midterminal between the field windings 36 and 38 is connected by conductor 56 to one end of the resistor 52, the other end of the resistor 52 being connected by conductors 58 and 60 to the cathode 50.

A pair of series-connected resistors 62 and 64 are disposed in circuit relation with the grids 46 and 48, respectively, for controlling the bias thereof. The resistors 62 and 64 are connected through a vacuum valve 66 provided with an anode 68, a cathode 72 and a control grid 70, to be energized from a source of supply such as the battery 74. Thus the resistors 62 and 64 are connected in the anode-cathode circuit of valve 66, the circuit extending from the anode 68 through the series-connected resistors 64 and 62, conductor 76, resistor 78 connected across the battery 74, conductor 80 and resistor 82 to the cathode 72.

As illustrated, a resistor 84 having an adjustable tap 86 is also connected across the battery 74 and is interconnected in one of the grid-cathode control circuits of the valve 40. The resistor 64 is also provided with an adjustable tap 88. The grid-cathode circuits of valve 40 can therefore be traced as extending from the grid 46 through conductor 89, tap 86, a part of resistor 84, conductor 76, resistor 62 and conductor 60 to the cathode 50, the other grid-cathode circuit extending from grid 48 through tap 88, a part of resistor 64 and conductor 60 to the cathode 50. The grid bias and balance thereof can therefore be controlled by adjusting the taps 88 and 86 of resistors 64 and 84, respectively.

In order to control the grid potential of the grid 70 of valve 66 a source of biasing potential represented by resistors 90 and 92 which are connected across batteries 94 and 96, respectively, is provided being connected in the grid-cathode circuit of valve 66. The grid-cathode circuit extends from the grid 70 through the biasing resistor 98, resistors 90 and 92, conductors 100 and 80 and resistor 82 to the cathode 72.

The voltage impressed across resistor 90 is substantially constant and is of such polarity as to provide a more negative bias on the grid 70. On the other hand, the resistor 92 is so connected across the battery 96, that the voltage impressed across resistor 92 is of opposite polarity as compared to that across resistor 90 to tend to render the grid bias less negative or more positive.

As illustrated, in order to vary the voltage impressed across resistor 92, a tapped resistor 102 is connected across the battery 96 and is disposed to be connected in circuit across the resistor 92 in accordance with the operation of a circuit controller 104. The circuit controller 104 in this instance is of the type illustrated and claimed in Patent No. 2,246,301, issued June 17, 1941, to Hanna et al. and is provided with a plurality of self-biased contact leaves 106 having one end thereof anchored against movement and connected sequentially to the taps of resistor 102, the other end of the contact leaves being biased to engage a sloped stop 108 in spaced relation to one another and to be actuated into progressive engagement by a driver member 110 to shunt progressive sections of the tapped resistor 102.

In order to control the operation of the driver member 110 and consequently the positioning of the contact leaves 106, an electromagnet 112 is provided, the electromagnet having a winding 114 connected across a full-wave rectifier 116 and being disposed to be energized in accordance with the deviation of the electrical quantity from a predetermined value which is to be maintained. Any suitable connection of the rectifier 116 to the load conductors 16, 18 and 20 can be made depending upon the electrical quantity which is to be regulated. In this instance, the block 118, potential transformer 120 and current transformers 122 and 124 represent a network for deriving the positive-sequence component of the line voltage, such a network being disclosed and claimed in Patent No. 2,426,108, which issued August 19, 1947, to E. L. Harder.

In operation, where the dynamo-electric machine 12, the exciter 24 and the regulating exciter or generator 28 are driven in any suitable manner and the electrical quantity, such as the voltage across the load conductors 16, 18 and 20 is at a predetermined value which is to be maintained, the electromagnet 112 is energized to force a predetermined number of the contact leaves 106 into engagement to shunt a part of the resistor 102 whereby the potential across resistor 92 is equal but opposite to the potential across resistor 90. Under such conditions, the grid 70 of valve 66 is so biased by the grid biasing resistor 98, that a predetermined current will flow in the circuit extending from one terminal of the battery 74 through conductor 76, resistors 62 and 64, the anode 68 and cathode 72 of valve 66, resistor 82 and conductor 80 to the other terminal of the battery 74.

The current flowing through resistors 62 and 64 effect voltage drops thereacross of such polarities as to render the cathode terminal of resistor 62 negative and the other terminal positive whereby a positive bias is applied to grid 46, whereas the cathode terminal of resistor 64 is rendered positive and the other terminal is rendered negative to supply a negative bias to the grid 48 through the adjustable tap 88. Under the conditions previously described where the potential drops across resistors 92 and 90 are equal and opposed so that no external voltage is applied to the grid 70 of valve 66, the taps 86 and 88 of resistors 84 and 64 are adjusted so that both halves of the valve 40 are cut off and current does not flow in either of the anode-cathode circuits of valve 40 and consequently current does not flow in either of the opposed control field windings 36 and 38.

If for any reason the voltage across the load conductors 16, 18 and 20 should tend to increase from the predetermined value which is to be maintained, the positive sequence network 118 effects an increase in the current flowing in the winding 114 of the electromagnet 112 to actuate the driver member 110 to force additional contact leaves 106 into engagement to shunt additional sections of resistor 102 whereby the potential across resistor 92 is more positive with respect to the potential across resistor 90 to thereby apply a more positive potential to the grid 70 of valve 66. As the grid 70 is rendered more positive, more current flows in the anode-cathode circuit of valve 66 and consequently through the series-connected resistors 62 and 64.

As the flow of current increases through the resistor 62, the positive portion of the grid bias impressed on the grid 46 from the resistors 62 and 84 increases and causes current to flow in the anode-cathode circuit extending from the anode 42 through control field winding 36, conductor 56, battery 54 and conductors 58 and 60 to the cathode 50 of valve 40. At the same time, the increase in the flow of current through resistor 64 will increase the negative bias applied to the grid 48 of valve 40 to prevent the anode-cathode circuit including anode 44 and cathode 50 from becoming conducting.

As the current flows in control field winding 36, the winding 36 produces an action that is in opposition to that of the self-energizing winding 32 to decrease the excitation of the regulating exciter 28 and consequently decrease the excitation of the exciter 24. As the output of the main exciter 24 is thus reduced, the excitation of the dynamo-electric machine 10 is also decreased to return the electrical quantity to the predetermined value which is to be maintained.

If the voltage across conductors 16, 18 and 20 should be decreased from the predetermined value which is to be maintained, then the electromagnet 112 is energized to release the conducting leaves 106 and connect additional sections of resistor 102 in the circuit whereby the potential across resistor 90 is more negative with respect to the potential across resistor 92 and a more negative potential is impressed on the grid 70 of valve 66 to effect a reduction in the current conducted by the anode-cathode of valve 66. As the current flow through resistors 62 and 64 is thus reduced, the potential drops across the series-connected resistors 62 and 64 are lowered whereby the positive portion of the bias applied to grid 46 is insufficient to render the anode-cathode circuit including anode 42, control field winding 36 and cathode 50 from becoming conducting. At the same time, the decrease in the drop across resistor 64 renders the potential applied to grid 48 less negative whereby the anode-cathode circuit controlled thereby becomes conducting. Thus current flows from the anode 44 through the control field winding 38, conductor 56, battery 54 and conductors 58 and 60 to the cathode 50.

The flow of current in the control field winding 38 just described produces an action that is cumulative to that of the self-energizing winding 32 to increase the excitation of the regulating exciter or generator 28, the resulting increased output therefrom effecting an increase in the excitation of the main exciter 24. As the output of the main exciter 24 is increased, the excitation of the dynamo-electric machine 10 is also increased to effectively return the electrical quantity to the predetermined value which is to be maintained.

The system of this invention is very sensitive and quick in response to variations of the electrical quantity to be regulated. It is formed of standard elements and can, therefore, be readily duplicated.

I claim as my invention:

1. In a regulating system for maintaining an electrical quantity substantially constant, in combination, means disposed for operation to control the electrical quantity, a pair of opposed control windings for said control means, a vacuum valve means disposed to connect the control windings to a source of energy, the vacuum valve means having twin anodes, grids and a cathode disposed for operation to selectively control the energization of the opposed control windings, a resistor in each of the twin grid-cathode circuits, said resistors being connected in series-circuit relation with each other having a common tap therebetween connected to the cathode of said vacuum valve means, a source of potential connected in series circuit relation with one of said resistors for cooperating therewith to control the bias of one of the twin grids, an adjustable tap for the other of said resistors connected to the other of the twin grids for adjusting the bias applied thereto, another valve means having an anode and cathode connected in series circuit relation with the series-connected resistors whereby the unidirectional flow of current in said series-connected anode-cathode circuit controls the flow of current in the series-connected resistors, a control grid for said another valve means, means for providing a grid biasing potential for the control grid, and means responsive to a departure of the electrical quantity from a predetermined value for controlling the polarity and degree of potential impressed on the control grid by the grid potential means.

2. In a regulating system for maintaining an electrical quantity substantially constant, in combination, means disposed for operation to control the electrical quantity, a pair of opposed control windings for said control means, a vacuum valve means disposed to connect the control windings to a source of energy, the vacuum valve means having twin anodes, grids and a cathode disposed for operation to selectively control the energization of the opposed control windings, a resistor in each of the twin grid-cathode circuits, said resistors being connected in series-circuit relation with each other having a common tap therebetween connected to the cathode of said vacuum valve means, a source of potential connected in series circuit relation with one of said resistors for cooperating therewith to control the bias of one of the twin grids, an adjustable tap for the other of said resistors connected to the other of the twin grids for adjusting the bias applied thereto, another valve means having an anode and cathode connected in series circuit relation with the series-connected resistors whereby the unidirectional flow of current in said series-connected anode-cathode circuit controls the flow of current in the series-connected resistors, a control grid for said another valve means, a pair of opposed sources of potential for providing a grid biasing potential for the control grid, and means responsive to a departure of the electrical quantity from a predetermined value for controlling one of said opposed sources of potential to control the polarity and degree of biasing potential impressed on the control grid from the pair of opposed sources.

3. In a regulating system for maintaining an electrical quantity substantially constant, in combination, a self-excited exciter disposed for operation to control the electrical quantity, a pair of opposed control field windings for the exciter, a vacuum valve means disposed to connect the control field windings to a source of energy, the vacuum valve means having twin anodes, grids and a cathode disposed for operation to selectively control the energization of the opposed control field windings, a resistor in each of the twin grid-cathode circuits, said resistors being connected in series-circuit relation with each other having a common tap therebetween connected to the cathode of said vacuum valve means, a source of potential connected in series circuit relation with one of said resistors for cooperating therewith to control the bias of one of the twin grids, an adjustable tap for the other of said resistors connected to the other of the twin grids for adjusting the bias applied thereto, another valve means having an anode and cathode connected in series circuit relation with said series-connected resistors whereby the unidirectional flow of current in said series-connected anode-cathode circuit controls the flow of current in the series-connected resistors, a control grid for said another valve means, a pair of opposed sources of potential for providing a grid biasing potential for the control grid, and means responsive to a departure of the electrical quantity from a predetermined value for controlling one of said opposed sources of potential to control the polarity and degree of biasing potential impressed on the control grid from the pair of opposed sources.

ROBERT M. JOLLY.

REFERENCES CITED

The following references are of record in the file of this patent:

UNITED STATES PATENTS

| Number | Name | Date |
| --- | --- | --- |
| 2,234,747 | Crever et al. | Mar. 11, 1941 |
| 2,401,421 | Hahn | June 4, 1946 |